United States Patent
Bartlett et al.

(10) Patent No.: US 10,928,186 B2
(45) Date of Patent: Feb. 23, 2021

(54) SYSTEM AND METHOD FOR THICKNESS MEASUREMENT IN TORTILLA PRODUCTION

(71) Applicant: Premier Innovations, LLC, Austin, TX (US)

(72) Inventors: Brian E. Bartlett, Etna, WY (US); Douglas W. Cotton, Katy, TX (US)

(73) Assignee: PREMIER INNOVATIONS, LLC, Austin, TX (US)

(*) Notice: Subject to any disclaimer, the term of this patent is extended or adjusted under 35 U.S.C. 154(b) by 43 days.

(21) Appl. No.: 16/372,750

(22) Filed: Apr. 2, 2019

(65) Prior Publication Data

US 2020/0318947 A1  Oct. 8, 2020

(51) Int. Cl.
G01B 11/06 (2006.01)
B65G 47/24 (2006.01)

(52) U.S. Cl.
CPC .......... *G01B 11/0691* (2013.01); *B65G 47/24* (2013.01)

(58) Field of Classification Search
CPC .............................. G01B 11/0691; G06N 7/005
See application file for complete search history.

(56) References Cited

U.S. PATENT DOCUMENTS

| | | | |
|---|---|---|---|
| 4,513,018 A | 4/1985 | Rubio | |
| 4,978,548 A | 12/1990 | Cope et al. | |
| 5,155,558 A | 10/1992 | Tannenbaum et al. | |
| 5,298,274 A | 3/1994 | Khalsa | |
| 5,399,367 A | 3/1995 | Mattson | |
| 5,400,704 A | 3/1995 | Huston | |
| 5,432,605 A * | 7/1995 | Naqwi | G01B 11/105 356/485 |
| 5,470,599 A | 11/1995 | Ruhe | |
| 5,539,213 A | 7/1996 | Meeks et al. | |
| 5,554,405 A | 9/1996 | Fazzolare et al. | |
| 5,652,010 A | 7/1997 | Gimmler et al. | |
| 5,918,533 A | 7/1999 | Lawrence et al. | |
| 6,001,409 A | 12/1999 | Gimmler et al. | |
| 6,491,959 B1 | 12/2002 | Chiang et al. | |
| 6,572,910 B2 | 6/2003 | Lanner et al. | |
| 6,830,767 B2 | 12/2004 | Teras et al. | |
| 9,468,217 B2 | 10/2016 | Ruhe | |
| 10,028,513 B2 | 7/2018 | Bartlett | |
| 2002/0178931 A1* | 12/2002 | Kikuchi | G01B 17/02 99/485 |
| 2006/0034988 A1* | 2/2006 | Bresnahan | A21C 11/10 426/502 |
| 2009/0059242 A1* | 3/2009 | Fujieda | G01B 11/0691 356/625 |

(Continued)

*Primary Examiner* — Michael A Lyons
(74) *Attorney, Agent, or Firm* — Olav M. Underdal; IDP Patent Services

(57) ABSTRACT

A production system for measuring product thickness in tortilla and tortilla chip production includes a production line, including a cooker/grinder, a sheeter/cutter, and a conveyor belt; and a displacement measurement unit, including a processor, non-transitory memory, an input/output component, a laser sensor for measuring vertical displacement of the conveyor belt and objects thereon, a laser controller, and a displacement calculator. Also disclosed is a method for thickness measurement, including capturing samples, calculating a vertical displacement probability density function, and calculating average product thickness.

13 Claims, 7 Drawing Sheets

(56) References Cited

U.S. PATENT DOCUMENTS

| | | | |
|---|---|---|---|
| 2012/0192721 A1 | 8/2012 | Gonzalez | |
| 2013/0039588 A1* | 2/2013 | Li | G06T 1/0028 |
| | | | 382/201 |
| 2016/0010976 A1* | 1/2016 | Nubling | G01B 11/04 |
| | | | 356/608 |
| 2017/0251679 A1* | 9/2017 | Bartlett | A21D 13/42 |

* cited by examiner

Displacement Measurement Unit

Method for Thickness Measurement

SYSTEM AND METHOD FOR THICKNESS MEASUREMENT IN TORTILLA PRODUCTION

CROSS-REFERENCE TO RELATED APPLICATIONS

N/A.

FIELD OF THE INVENTION

The present invention relates generally to the field of tortilla production, and more particularly to methods and systems for measuring thickness of tortillas, tortilla chips, and other food products.

BACKGROUND OF THE INVENTION

A variety of standardized designs have been developed for production lines used in industrial food production of tortillas and tortilla chips. Well known methods are used to measure thickness of masa pieces prior to baking, but such methods rely on extensive calibration to determine vertical position of the conveyor belt. Most such methods depend on weight measurement and thereby employ an indirect measurement method. Additionally, conventional methods require a very smooth belt in order to be sufficiently accurate.

As such, considering the foregoing, it may be appreciated that there continues to be a need for novel and improved devices and methods for measuring product thickness before and after baking and optionally frying of tortillas and tortilla chips, and other food products.

SUMMARY OF THE INVENTION

The foregoing needs are met, to a great extent, by the present invention, wherein in aspects of this invention, enhancements are provided to the existing models for measuring product thickness in tortilla and tortilla chip production.

In an aspect, a production system for measuring product thickness, can include:
a) a production line, including:
  a conveyor belt, which can be configured to move a plurality of product pieces;
b) a laser sensor, which can be configured to take continuous vertical displacement measurements of objects passing by in a static point of the conveyor belt, such that the laser sensor obtains a continuous sequence of vertical displacement measurements at a predetermined measuring rate; and
c) a displacement measurement unit, which can be configured to receive the continuous sequence of vertical displacement measurements.

In a related aspect, the production line can further include the plurality of product pieces, wherein the product pieces are masa pieces of a masa.

In another related aspect, the displacement measurement unit can further include:
a) a processor;
b) a non-transitory memory;
c) an input/output component; and
d) a displacement calculator, which can be configured to analyze the continuous sequence of vertical displacement measurements in order to calculate a probability density function for the continuous sequence of vertical displacement measurements; all connected via
e) a data bus.

In a related aspect, the displacement calculator can be configured to calculate the probability density function, by executing a function fitting algorithm to fit the probability density function to the continuous sequence of vertical displacement measurements.

In a further related aspect, the function fitting algorithm is an artificial neural network that is trained on the continuous sequence of vertical displacement measurements.

In another further related aspect, the displacement calculator can be configured to use the probability density function to calculate an average product thickness as a difference between a product upper surface displacement position and a belt surface displacement position.

In yet a further related aspect, the displacement calculator is configured to calculate the belt surface displacement position, such that a predetermined threshold ratio of a belt response portion of the probability density function is below the belt surface displacement position.

In a yet further related aspect, the displacement calculator can be configured to calculate the belt surface displacement position, by integrating the probability density function from zero until reaching a null response portion, thereby calculating a total integral of the belt response portion, such that the belt surface displacement position is calculated such that a ratio between a threshold integral of the probability density function from zero to the belt surface displacement position and the total integral of the belt response portion equals the predetermined threshold ratio.

In another related aspect, the displacement calculator is configured to calculate the product upper surface displacement position, as a maximum likelihood response of the probability density function in a product piece response portion of the probability density function, above a null response portion.

In a further related aspect, the displacement calculator is configured to find the maximum likelihood response using an optimization method of gradient ascent.

There has thus been outlined, rather broadly, certain embodiments of the invention in order that the detailed description thereof herein may be better understood, and in order that the present contribution to the art may be better appreciated. There are, of course, additional embodiments of the invention that will be described below and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of embodiments in addition to those described and of being practiced and carried out in various ways. In addition, it is to be understood that the phraseology and terminology employed herein, as well as the abstract, are for the purpose of description and should not be regarded as limiting.

As such, those skilled in the art will appreciate that the conception upon which this disclosure is based may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

DETAILED DESCRIPTION

Figure 1:
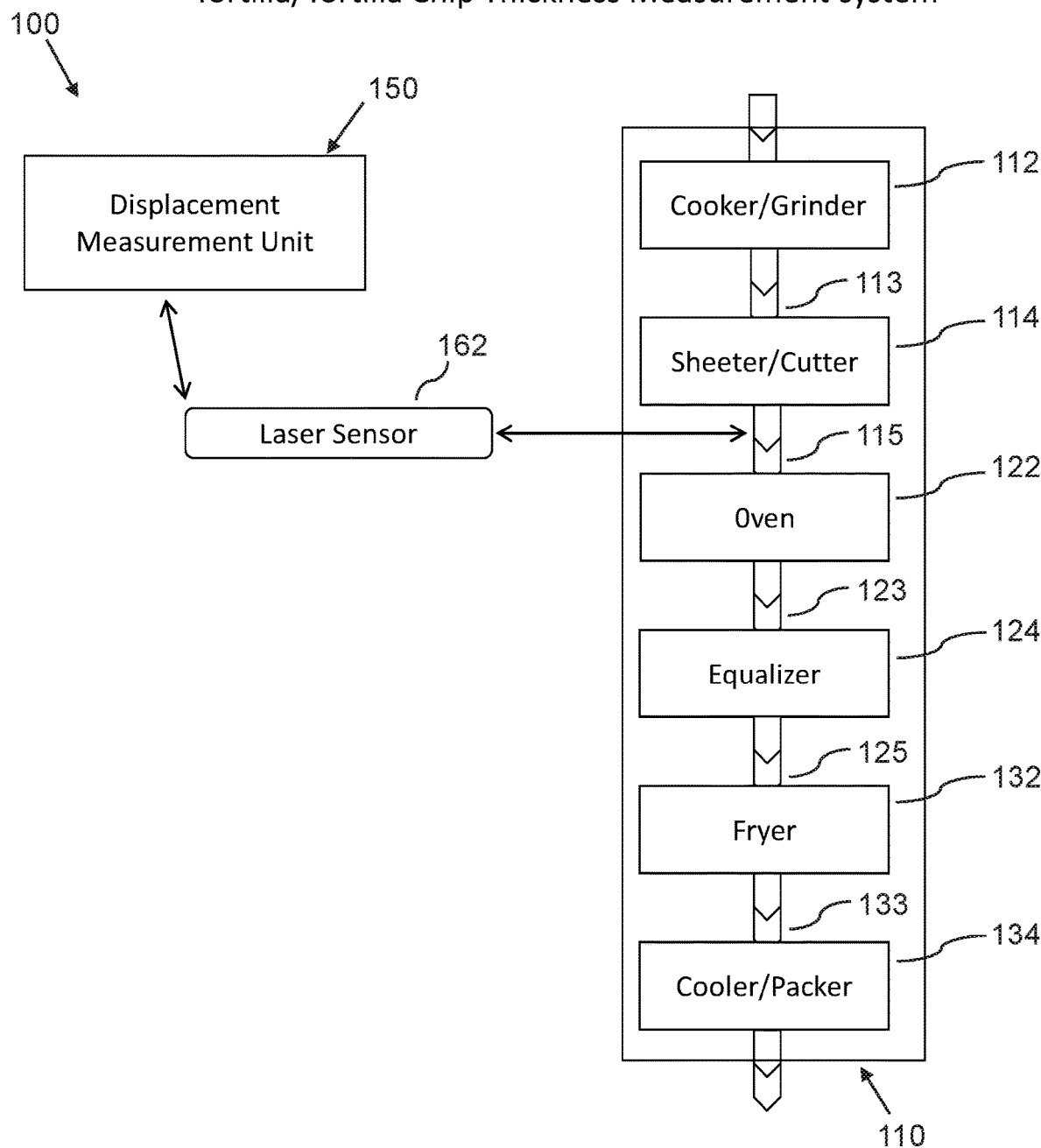
FIG. 1 is a schematic diagram illustrating a system for thickness measurement, according to an embodiment of the invention.

Before describing the invention in detail, it should be observed that the present invention resides primarily in a novel and non-obvious combination of elements and process steps. So as not to obscure the disclosure with details that will readily be apparent to those skilled in the art, certain conventional elements and steps have been presented with lesser detail, while the drawings and specification describe in greater detail other elements and steps pertinent to understanding the invention.

The following embodiments are not intended to define limits as to the structure or method of the invention, but only to provide exemplary constructions. The embodiments are permissive rather than mandatory and illustrative rather than exhaustive.

In the following, we describe the structure of an embodiment of a production system 100 with reference to FIG. 1, in such manner that like reference numerals refer to like components throughout; a convention that we shall employ for the remainder of this specification.

Figure 3A:
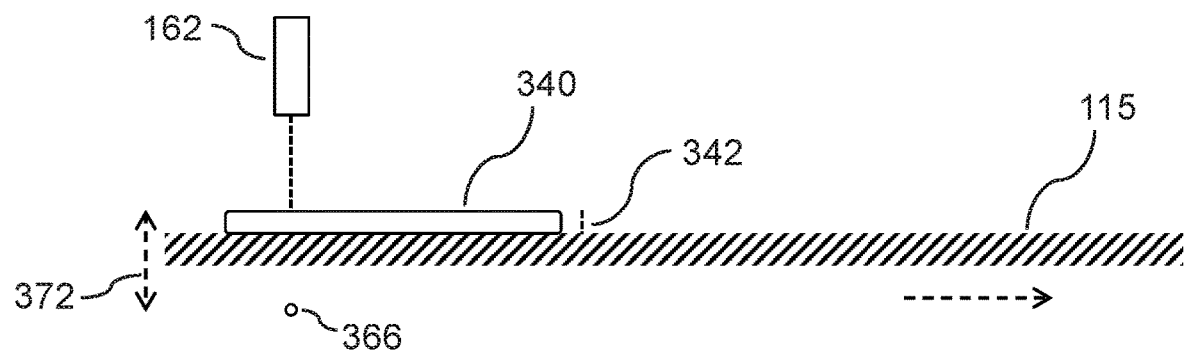
FIG. 3A is a schematic cross-section diagram illustrating a part of a system for thickness measurement, showing a tortilla piece on a conveyor belt, according to an embodiment of the invention.
Figure 3B:
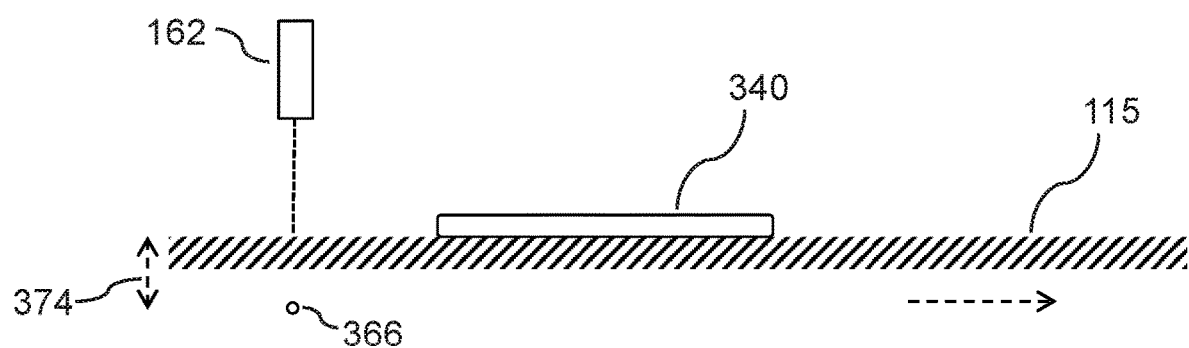
FIG. 3B is a schematic cross-section diagram illustrating a part of a system for thickness measurement, showing a tortilla piece on a conveyor belt, according to an embodiment of the invention.
Figure 3C:
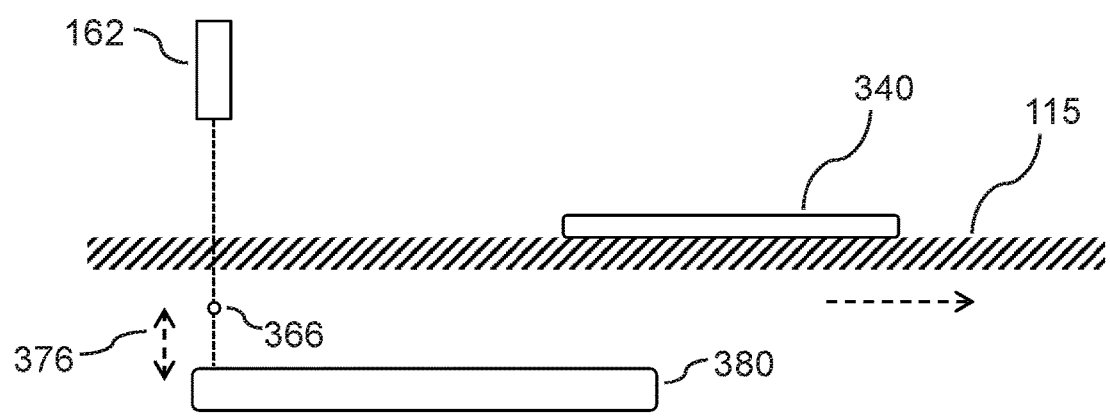
FIG. 3C is a schematic cross-section diagram illustrating a part of a system for thickness measurement, showing a tortilla piece on a conveyor belt, according to an embodiment of the invention.
Figure 4:
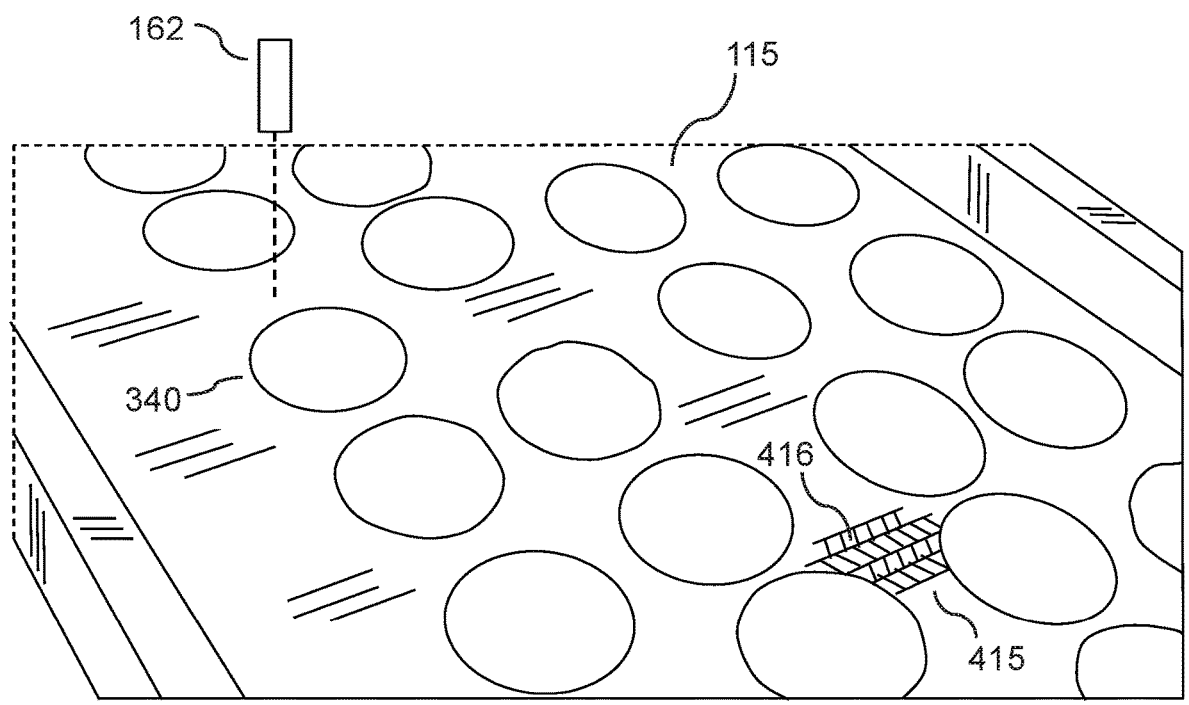
FIG. 4 is a perspective of a part of a system for thickness measurement, showing tortilla pieces on a conveyor belt, according to an embodiment of the invention.

In an embodiment, as shown in FIGS. 1 and 3A-3C, a production system 100 for thickness measurement in tortilla and tortilla chip production can include at least one, a subset of, or all of:

a) a production line, including:
  i. a cooker/grinder 112; which is configured to
    1. receive a mixture of raw corn, water, and food-grade lime, in the form of calcium oxide (quicklime) or calcium hydroxide (hydrated lime);
    2. cook the mixture, and optionally quench the cooked mixture;
    3. grind the mixture, thereby creating corn masa, a traditional corn dough used for tortilla production; and
    4. optionally, quench the masa, wherein the cooker/grinder is configured to rapidly cool the masa down to about 68-72 degrees Celsius;
    In related embodiment, the cooker/grinder 112 can include a subsystem of corn holding hopper, a kettle for cooking, soak tanks for soaking the cooked corn, a corn washer, a mill/grinder, and a masa pump, all connected via pipes and/or other conveyors;
  ii. A sheeter/cutter 114, which is configured to:
    1. receive the masa from the cooker/grinder 112, via a cooker conveyor 113, which can be a pipe conveyor 113;
    2. form a sheet of the masa, which is kneaded, extruded and fed through sheeter rolls, to form a sheet;
    3. cutting product pieces from the sheet of masa, such that the product pieces are configured to be used for tortilla chips or tortillas, and can be cut in at least one predetermined shape;
  iii. An oven 122, which is configured to receive the pieces from the sheeter/cutter 114 via a sheeter conveyor belt 115, such that the pieces pass through the oven 122 on an internal conveyor, such that the pieces are baked when passing through the oven 122. The oven 122 can be gas fired, and the internal oven conveyor can be arranged in multiple sections, tiers, or levels, which for example can include three oven levels arranged at different heights in the oven 122;
  iv. An equalizer 124, which can also be called a proofer or cooler, which is configured to receive the baked pieces from the oven 122 via an oven conveyor 123, such that the equalizer 124 is configured to cool the baked pieces;
  v. A fryer 132, which is configured to receive the baked pieces from the equalizer 124, via an equalizer conveyor 125, such that the fryer 132 is configured to fry the cooled baked pieces; and
  vi. A cooler/packaging machine 134, which is configured to receive the fried pieces from the fryer 132, via a fryer conveyor 133, such that the cooler/packaging machine 134 is configured to cool and pack the fried pieces;
b) A laser sensor 162, which is configured to take continuous vertical displacement measurements 372, 374, 376 of objects 340 passing by in a static point of the sheeter conveyor belt 115, such that the laser sensor 162 obtains a continuous sequence of height/displacement measurements 372, 374, 376 at a predetermined measuring rate of up to 20 kilohertz or higher, such as for example at least 4 kilohertz; and
c) A displacement measurement unit 150, which can be configured to receive the continuous sequence of vertical displacement measurements, and calculate a probability density function 500 for height/vertical displacement measurements 372, 374, 376, such that the displacement measurement unit 150 can use the probability density function to calculate an average product thickness 342, as the difference between the product upper surface displacement position 532 and the belt surface position 512; and In a related embodiment, FIGS. 3A, 3B, and 3C show a tortilla masa piece 340 on a conveyor belt 115, just after it leaves the sheeter 114. The conveyor belt 115, as shown in FIG. 4, can for example be chain conveyor belt 415 or a wire mesh conveyor belt 415, with apertures 416. A gap between sheeter rollers on the sheeter 114 along with various masa quantities/properties determine the thickness 342 of the tortilla pieces 340 that are emitted from the sheeter 114.

In a related embodiment, a laser sensor 162 can be mounted in a static position and configured to take continuous measurements of objects passing by in a static point of the sheeter conveyor belt 115. The laser sensor 162 can be mounted perpendicularly to the conveyor belt 115, above the conveyor belt 115, such that the laser sensor 162 is configured to measures a vertical displacement 372, 374, 376 of obstructions below, such as objects 340 on the belt 115, including tortilla pieces 340, the belt 115 itself, or structure below the belt (if the laser signal passes through apertures 416 in the belt 115). A zero displacement 366 can be arbitrarily defined to be a predetermined position below the belt, such that the laser sensor 162 is configured to measure an obstruction distance 372 from the zero-displacement position 366, whereby a maximum distance measurement is obtained as a position immediately adjacent to the laser sensor. The belt 115 is subject to vibration, which can be significant and make direct measurement impractical. The vibration will normally be centered around one frequency and can be removed using standard digital filtering techniques.

Thus, the laser sensor 162 can measure the distance to the top of the tortilla or the chain belt, or possibly pass through the chain belt. The chain belt will report various distances, with the highest being the top of the belt, the surface that the tortilla rests upon.

FIG. 3A shows the measurement of a vertical displacement/obstruction distance 372 to the top of a tortilla piece 340.

FIG. 3B shows the measurement of an vertical displacement/obstruction distance 374 to the top of the conveyor belt 115.

FIG. 3C shows the measurement of an obstruction distance 376 to an object 380 below the conveyor belt and below the zero-displacement position 366. In this case, the obstruction distance is negative since the object is below the zero displacement 366. The vertical displacement 372, 374, 376, can alternatively be called a distance 372, 374, 376, a vertical distance 372, 374, 376, or height 372, 374, 376.

In a further related embodiment, the laser sensor 162 can be configured with a sample frequency of greater than 1-4 khz, for example in a range of 4-20 khz.

Figure 2:
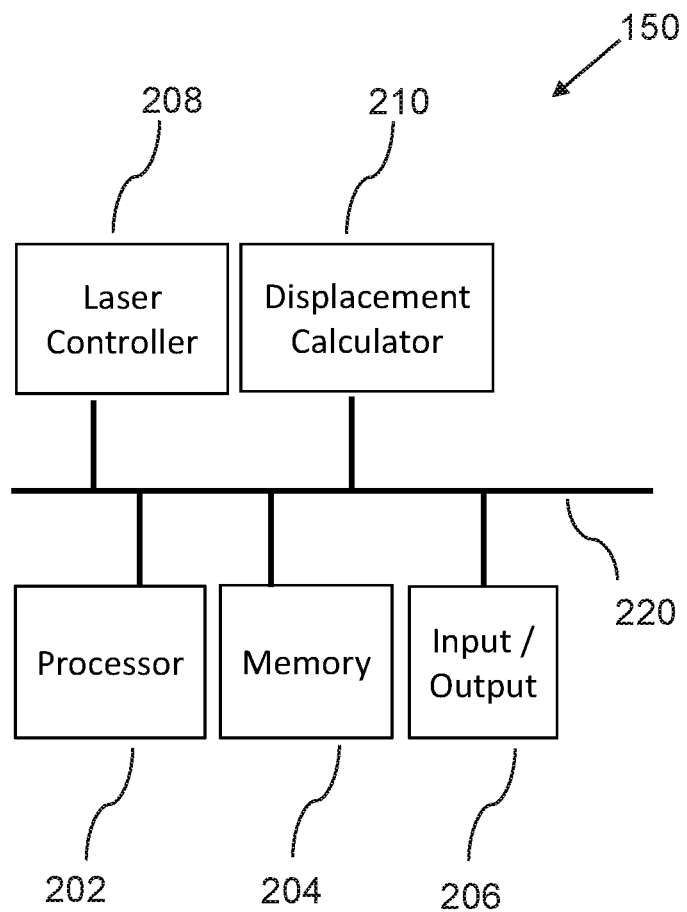
FIG. 2 is a schematic diagram illustrating a thickness measurement control unit, according to an embodiment of the invention.

In a related embodiment, as shown in FIG. 2, a displacement measurement unit 150 can include:
a) A processor 202;
b) A non-transitory memory 204;
c) An input/output component 206;
d) A laser controller 208, which can be configured to control the laser sensor 162, and can disable and enable the laser sensor 162; and
e) A displacement calculator 210, which can be configured to analyze the continuous sequence of height measurements 372, 374, 376 from the laser sensor 162 in order to calculate a probability density function 500 for height/vertical displacement measurements 372, 374, 376; all connected via
f) A data bus 220.

Figure 5:
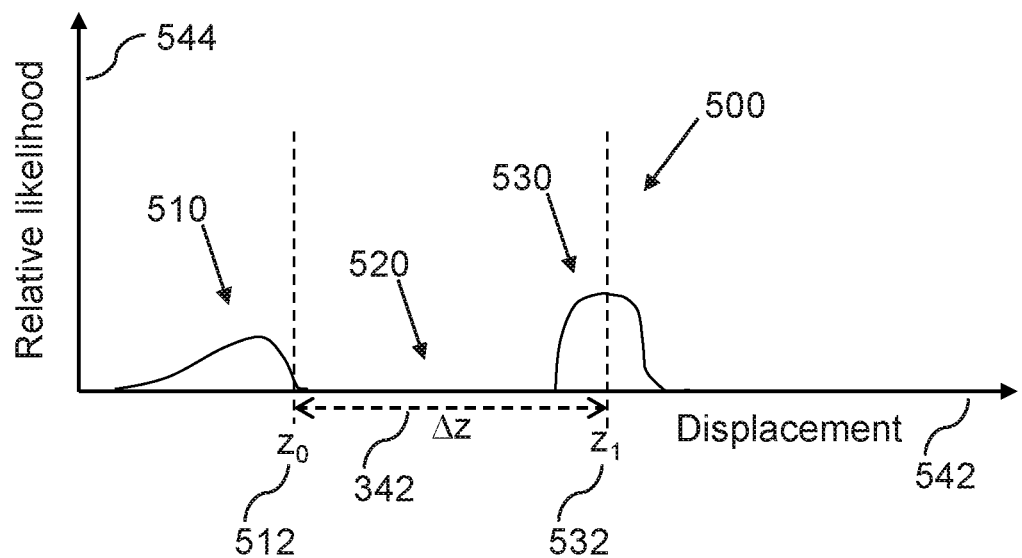
FIG. 5 is a schematic diagram illustrating a vertical displacement probability density function, according to an embodiment of the invention.

In a related embodiment, FIG. 5 shows a graph of a displacement probability density function 500, which is a mapping/function from vertical displacement 542 to a relative likelihood 544. The graph of the displacement probability density function 500 shows a belt response portion 510, and a product piece response portion 530. The null response portion 520, also called $Z_{Null}$ 520, shows vertical displacement positions between the belt 115 and the top of the tortilla pieces 340, where no readings are expected, and therefore resulting in a zero response.

Figure 6:
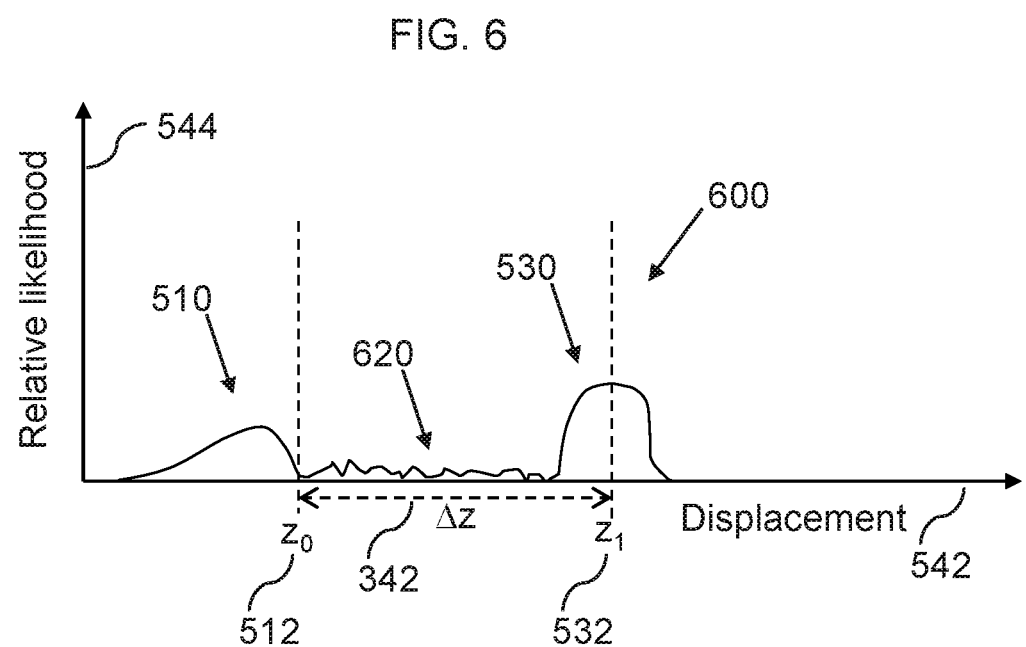
FIG. 6 is a schematic diagram illustrating a vertical displacement probability density function, according to an embodiment of the invention.

In a further related embodiment, as shown in FIG. 6, the null response portion 620 of the displacement probability density function 600 may have some noise signals, which for example can result from edges of the objects 340 on the belt 115, or from vibrations of the belt 115. Such noise may be removed by filtering, or disregarded or set to zero, if below some minimum noise threshold.

In a related embodiment, the displacement calculator 210, can be configured to calculate and store a probability density function 500 for the continuous sequence of height measurements, such that the probability density function 500 is a mapping/function from vertical displacement 542 to a relative likelihood 544 (or frequency/occurrence count 544).

In a further related embodiment, the displacement calculator 210, can be configured to remove/filter noise and other irrelevant parts from the continuous sequence, prior to calculating the Fast Fourier Transform, which can include removing:
a) Low frequency signals, which correspond to a conveyor 123 125 133 surface, such that signals below a predetermined low-frequency threshold are removed. The low-frequency threshold can be a calibrated value; and
b) High frequency signals, which can correspond to a chip edge, or can be associated with other artifacts not related to a chip surface, such that signals above a predetermined high-frequency threshold are removed. The high-frequency threshold can be a calibrated value; whereby the remaining signal is strongly correlated with surfaces of chips that are transported on the conveyor 123 125 133.

In a related embodiment, the displacement calculator 210 can be implemented with a high-speed signal processor, which can be FPGA based, or it can be implemented as a combination of software and a high-speed signal processor, or purely in software.

In a further related embodiment, the high-speed signal processor of the displacement calculator 210 can be configured to filter out significant noise from variation in thickness, movement and vibration of the conveyor, etc.

In a yet further related embodiment, the displacement calculator 210 can be configured to calculate a probability density function 500 by fitting or matching a non-linear or linear function to the continuous sequence of vertical displacement measurements 372, 374, 376, using well-known methods for function fitting of data samples, wherein the continuous sequence of vertical displacement measurements are represented as a frequency histogram 710 of frequencies 544 (i.e. frequency is the number of occurrences) within bins 712 or range-portions 712 of the input domain of heights/displacements 542. Such function fitting can for example be calculated by using a plurality of well-known methods from the areas of machine learning, function approximation, and curve fitting, including:
a) calculating the probability density function 500 by configuring the probability density function 500 as an artificial neural network, and training the artificial neural network on the plurality of displacement measurements; or b) calculating the probability density function 500 by a linear or non-linear least-square function approximation to match the plurality of displacement measurements.

Figure 7:
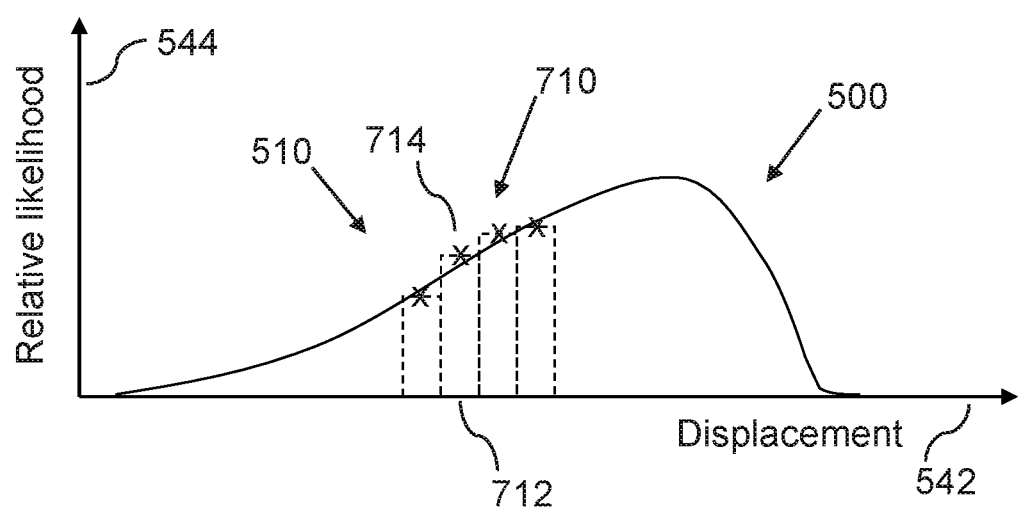
FIG. 7 is a schematic diagram illustrating a portion of a vertical displacement probability density function, according to an embodiment of the invention.

In a related embodiment, the displacement calculator 210 can be configured to calculate the probability density function 500, which maps vertical displacement 542 to a relative likelihood 544 (or frequency/occurrence count 544), such that the probability density function 500 can be calculated by executing a function fitting algorithm to fit the probability density function to the continuous sequence of vertical displacement measurements 372, 374, 376, such that the continuous sequence of vertical displacement measurements is represented as a frequency histogram 710, as shown in FIG. 7, which maps range-portions 712 (such as for example the range-portion of a height between 3.2-3.3 mm) to a frequency 544 (i.e. count of occurrences; such as for example a total count of 10 measurements within the range-portion of a height between 3.2-3.3 mm). The function fitting is thereby performed on the frequency histogram representation 710 of the continuous sequence of vertical displacement measurements 372, 374, 376, wherein the frequency histogram comprises a plurality of histogram points 714, each including a range-portion 712 (for example represented as an average 542 or mid height/displacement value 542) and a frequency 544. Thus, in an alternative description, it can be stated that the displacement calculator 210 can be configured to calculate the probability density function 500, by executing a function fitting algorithm to fit a probability density function 500 to a frequency histogram representation 710 of the continuous sequence of vertical displacement measurements. For clarity, FIG. 7 shows only a portion of the probability density function 500 and thereof only a portion of the frequency histogram 710, and the size of range-portions 712 has been exaggerated. Normally substantially smaller range bins 712 would be desired for more accurate modelling of the probability density function 500.

In a further related embodiment, the function fitting algorithm can be an artificial neural network that is trained on the continuous sequence of vertical displacement measurements 372, 374, 376.

In another further related embodiment, the function fitting algorithm can be a non-linear least-square function approximation to the continuous sequence of vertical displacement measurements 372, 374, 376.

In a related embodiment, the displacement calculator 210 can be configured to calculate a belt surface displacement position 512, as shown in FIG. 5, as the point 512 wherein a predetermined threshold ratio of the belt response portion 510 is below the belt surface displacement position 512, thereby identifying the displacement 512 of the top of the conveyor belt 115. The predetermined threshold ratio can for example be in a range of 80-100%, 90-99%, 95-99.99%, or can be set to a 3-sigma confidence, corresponding to substantially 99.7%.

In a further related embodiment, the displacement calculator 210 can be configured to calculate the belt surface displacement position 512, by integrating the probability density function 500 from zero until reaching the null response portion 520, thereby calculating the total integral of the belt response portion 510, such that the belt surface position 512 is calculated as the threshold displacement 512, wherein a ratio between a threshold integral of the probability density function 500 from zero to the threshold displacement 512 and the total integral of the belt response portion 510 equals the predetermined threshold ratio.

In a further related embodiment, the displacement calculator 210 can be configured to calculate the product upper surface displacement position 532, as the maximum likelihood response 532 of the probability density function 500 in the masa piece response portion 530, above the null response portion 520.

In a further related embodiment, the maximum likelihood response can for example be found using well known linear or non-linear optimization methods, such as steepest/gradient ascent (i.e. steepest/gradient descent on the negated maximum likelihood response function) or Newton's method, to find a local maximum response 532 in the input range above the above the null response portion 520, i.e. in the product/masa piece response portion 530. Alternatively, the maximum likelihood response can be found by identifying the half integration aggregate point, which is the point where the integral of the probability density function 500 from the null response portion 520 to the half integration aggregate point is 50%/half of the total integral over the product/masa piece response portion 530.

In a further related embodiment, the displacement calculator 210 can be configured to use the probability density function to calculate an average product thickness 342, as the difference between the product upper surface displacement position 532 and the belt surface position 512.

In a related embodiment, a laser sensor can be mounted in a static position and configured to take continuous measurements of objects passing by in a static point of the equalizer conveyor 125.

In a related embodiment, a laser sensor can be mounted in a static position and configured to take continuous measurements of objects passing by in a static point of the fryer conveyor 133. Alternatively, or additionally, in further related embodiments, a laser sensor can be mounted in a static position and configured to take continuous measurements of objects passing by in a static point of the oven conveyor 123, and/or a cooler conveyor, after cooling in the cooler/packaging machine 134.

Figure 8:
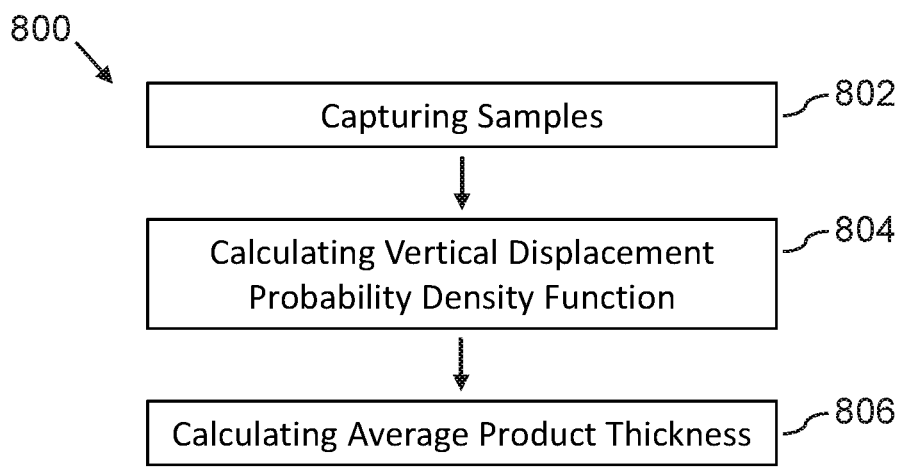
FIG. 8 is a flowchart illustrating steps that may be followed, in accordance with one embodiment of a method of thickness measurement.

In an embodiment, as illustrated in FIG. 8 a method for measuring product thickness 800, can include:

a) Capturing samples 802, wherein a plurality of vertical displacement measurements 372, 374, 376 are captured at a predetermined sampling rate during a predetermined capture period;

b) Calculating a vertical displacement probability density function 804, wherein the plurality of displacement measurements 372, 374, 376 are used to calculate the vertical displacement probability density function 500, which maps vertical displacement 542 to a relative likelihood 544, by executing a function fitting algorithm to fit the vertical displacement probability density function 500 to the plurality of vertical displacement measurements; and c) Calculating an average product thickness 806, wherein the product thickness 342 can be calculated as a difference between a product upper surface displacement position 532 and a belt surface displacement position 512.

In a related embodiment, the method for measuring product thickness 800, can further include calculating the belt surface displacement position 512, such that a predetermined threshold ratio of a belt response portion 510 of the probability density function 500 is below the belt surface displacement position 512.

In a further related embodiment, the method for measuring product thickness 800, can further include integrating the probability density function 500 from zero until reaching a null response portion 520, thereby calculating a total integral of the belt response portion 510, such that the belt surface displacement position 512 is calculated such that a ratio between a threshold integral of the probability density function 500 from zero to the belt surface displacement position 512 and the total integral of the belt response portion 510 equals the predetermined threshold ratio.

In a related embodiment, the method for measuring product thickness 800, can further include calculating the product upper surface displacement position 532, as a maximum likelihood response 532 of the probability density function 500 in a product piece response portion 530 of the probability density function 500, above a null response portion 520.

In a related embodiment, the method for measuring product thickness 800, can further include finding the maximum likelihood response using an optimization method of gradient ascent on the product piece response portion 530 of the probability density function 500.

FIGS. 1, 2, and 8 are block diagrams and flowcharts, methods, devices, systems, apparatuses, and computer program products according to various embodiments of the present invention. It shall be understood that each block or step of the block diagram, flowchart and control flow illustrations, and combinations of blocks in the block diagram, flowchart and control flow illustrations, can be implemented by computer program instructions or other means. Although computer program instructions are discussed, an apparatus or system according to the present invention can include other means, such as hardware or some combination of hardware and software, including one or more processors or controllers, for performing the disclosed functions.

In this regard, FIGS. 1, 2, and 8 depict the computer devices of various embodiments, each containing several of the key components of a general-purpose computer by which an embodiment of the present invention may be implemented. Those of ordinary skill in the art will appreciate that a computer can include many components. However, it is not necessary that all of these generally conventional components be shown in order to disclose an illustrative embodiment for practicing the invention. The general-purpose computer can include a processing unit and a system memory, which may include various forms of non-transitory storage media such as random-access memory (RAM) and read-only memory (ROM). The computer also may include nonvolatile storage memory, such as a hard disk drive, where additional data can be stored.

It shall be understood that the above-mentioned components of the displacement measurement unit 150 are to be interpreted in the most general manner.

For example, the processor 202 can include a single physical microprocessor or microcontroller, a cluster of processors, a datacenter or a cluster of datacenters, a computing cloud service, and the like.

In a further example, the non-transitory memory 204 can include various forms of non-transitory storage media, including random access memory and other forms of dynamic storage, and hard disks, hard disk clusters, cloud storage services, and other forms of long-term storage. Similarly, the input/output 206 can include a plurality of well-known input/output devices, such as screens, keyboards, pointing devices, motion trackers, communication ports, and so forth.

Furthermore, it shall be understood that the displacement measurement unit 150 can include a number of other components that are well known in the art of general computer devices, and therefore shall not be further described herein.

This can include system access to common functions and hardware, such as for example via operating system layers such as Windows, Linux, and similar operating system software, but can also include configurations wherein application services are executing directly on server hardware or via a hardware abstraction layer other than a complete operating system.

An embodiment of the present invention can also include one or more input or output components, such as a mouse, keyboard, monitor, and the like. A display can be provided for viewing text and graphical data, as well as a user interface to allow a user to request specific operations. Furthermore, an embodiment of the present invention may be connected to one or more remote computers via a network interface. The connection may be over a local area network (LAN) wide area network (WAN), and can include all of the necessary circuitry for such a connection.

In a related embodiment, the displacement measurement unit 150 can communicate with the production line 110 over a network, which can include the general Internet, a Wide Area Network or a Local Area Network, or another form of communication network, transmitted on wired or wireless connections. Wireless networks can for example include Ethernet, Wi-Fi, Bluetooth, ZigBee, and NFC. The communication can be transferred via a secure, encrypted communication protocol.

Typically, computer program instructions may be loaded onto the computer or other general-purpose programmable machine to produce a specialized machine, such that the instructions that execute on the computer or other programmable machine create means for implementing the functions specified in the block diagrams, schematic diagrams or flowcharts. Such computer program instructions may also be stored in a computer-readable medium that when loaded into a computer or other programmable machine can direct the machine to function in a particular manner, such that the instructions stored in the computer-readable medium produce an article of manufacture including instruction means that implement the function specified in the block diagrams, schematic diagrams or flowcharts.

In addition, the computer program instructions may be loaded into a computer or other programmable machine to cause a series of operational steps to be performed by the computer or other programmable machine to produce a computer-implemented process, such that the instructions that execute on the computer or other programmable machine provide steps for implementing the functions specified in the block diagram, schematic diagram, flowchart block or step.

Accordingly, blocks or steps of the block diagram, flowchart or control flow illustrations support combinations of means for performing the specified functions, combinations of steps for performing the specified functions and program instruction means for performing the specified functions. It will also be understood that each block or step of the block diagrams, schematic diagrams or flowcharts, as well as combinations of blocks or steps, can be implemented by special purpose hardware-based computer systems, or combinations of special purpose hardware and computer instructions, that perform the specified functions or steps.

As an example, provided for purposes of illustration only, a data input software tool of a search engine application can be a representative means for receiving a query including one or more search terms. Similar software tools of applications, or implementations of embodiments of the present invention, can be means for performing the specified functions. For example, an embodiment of the present invention may include computer software for interfacing a processing element with a user-controlled input device, such as a mouse, keyboard, touch screen display, scanner, or the like. Similarly, an output of an embodiment of the present invention may include, for example, a combination of display software, video card hardware, and display hardware. A processing element may include, for example, a controller or microprocessor, such as a central processing unit (CPU), arithmetic logic unit (ALU), or control unit.

Here has thus been described a multitude of embodiments of the production system 100, and devices, components, and methods related thereto, which can be employed in numerous modes of usage.

The many features and advantages of the invention are apparent from the detailed specification, and thus, it is intended by the appended claims to cover all such features and advantages of the invention, which fall within the true spirit and scope of the invention.

Many such alternative configurations are readily apparent, and should be considered fully included in this specification and the claims appended hereto. Accordingly, since numerous modifications and variations will readily occur to those skilled in the art, it is not desired to limit the invention to the exact construction and operation illustrated and described, and thus, all suitable modifications and equivalents may be resorted to, falling within the scope of the invention.

What is claimed is:

1. A production system for measuring product thickness, comprising:
   a) a production line, comprising:
      a conveyor belt, which is configured to move a plurality of product pieces;
   b) a laser sensor, which is configured to take continuous vertical displacement measurements of objects passing by in a static point of the conveyor belt, such that the laser sensor obtains a continuous sequence of vertical displacement measurements at a predetermined measuring rate; and
   c) a displacement measurement unit, which is configured to receive the continuous sequence of vertical displacement measurements, wherein the displacement measurement unit further comprises:
      a processor;
      a non-transitory memory;
      an input/output component; and
      a displacement calculator, which is configured to analyze the continuous sequence of vertical displacement measurements in order to calculate a probability density function for the continuous sequence of vertical displacement measurements; all connected via
      a data bus;
      wherein the displacement calculator is configured to use the probability density function to calculate an average product thickness as a difference between a product upper surface displacement position and a belt surface displacement position;
      wherein the displacement calculator is configured to calculate the belt surface displacement position, such that a predetermined threshold ratio of a belt response portion of the probability density function is below the belt surface displacement position; and
      wherein the displacement calculator is configured to calculate the belt surface displacement position, by integrating the probability density function from zero until reaching a null response portion, thereby calculating a total integral of the belt response portion, such that the belt surface displacement position is calculated such that a ratio between a threshold integral of the probability density function from zero to the belt surface displacement position and the total integral of the belt response portion equals the predetermined threshold ratio.

2. The production system of claim 1, wherein the production line further comprises the plurality of product pieces, wherein the product pieces are masa pieces of a masa.

3. The production system of claim 1, wherein the predetermined measuring rate is at least 4 kilohertz.

4. The production system of claim 1, wherein the displacement calculator is configured to calculate the probability density function, by executing a function fitting algorithm to fit the probability density function to the continuous sequence of vertical displacement measurements.

5. The production system of claim 4, wherein the function fitting algorithm is a non-linear least-square function approximation to the continuous sequence of vertical displacement measurements.

6. The production system of claim 1, wherein the predetermined threshold ratio is in a range of 95-99.99%.

7. The production system of claim 1, wherein the displacement calculator is configured to calculate the product upper surface displacement position, as a maximum likelihood response of the probability density function in a product piece response portion of the probability density function, above a null response portion.

8. The production system of claim 7, wherein the displacement calculator is configured to find the maximum likelihood response using an optimization method of gradient ascent.

9. A production system for measuring product thickness, comprising:
   a) a laser sensor, which is configured to take continuous vertical displacement measurements of objects passing by in a static point of a conveyor belt, such that the laser sensor obtains a continuous sequence of vertical displacement measurements at a predetermined measuring rate; and
   b) a displacement measurement unit, which is configured to receive the continuous sequence of vertical displacement measurements, wherein the displacement measurement unit further comprises:
      a displacement calculator, which is configured to analyze the continuous sequence of vertical displacement measurements in order to calculate a probability density function for the continuous sequence of vertical displacement measurements;
      wherein the displacement calculator is configured to use the probability density function to calculate an average product thickness as a difference between a product upper surface displacement position and a belt surface displacement position;
      wherein the displacement calculator is configured to calculate the belt surface displacement position, such that a predetermined threshold ratio of a belt response portion of the probability density function is below the belt surface displacement position; and
      wherein the displacement calculator is configured to calculate the belt surface displacement position, by integrating the probability density function from zero until reaching a null response portion, thereby calculating a total integral of the belt response portion, such that the belt surface displacement position is calculated such that a ratio between a threshold integral of the probability density function from zero to the belt surface displacement position and the total integral of the belt response portion equals the predetermined threshold ratio.

10. The production system of claim 9, wherein the displacement measurement unit further comprises:
   a) a processor;
   b) a non-transitory memory; and
   c) an input/output component; all connected via
   d) a data bus;
   wherein the displacement calculator is configured to calculate the probability density function, by executing a function fitting algorithm to fit the probability density function to the continuous sequence of vertical displacement measurements.

11. A method for measuring product thickness, comprising:
   a) capturing samples, wherein a plurality of vertical displacement measurements are captured at a predetermined sampling rate during a predetermined capture period;
   b) calculating a vertical displacement probability density function, wherein the plurality of vertical displacement measurements are used to calculate the vertical displacement probability density function which maps vertical displacement to a relative likelihood, by executing a function fitting algorithm to fit the vertical displacement probability density function to the plurality of vertical displacement measurements;
   c) calculating an average product thickness as a difference between a product upper surface displacement position and a belt surface displacement position;
   d) calculating the belt surface displacement position, such that a predetermined threshold ratio of a belt response portion of the vertical displacement probability density function is below the belt surface displacement position; and
   e) integrating the vertical displacement probability density function from zero until reaching a null response portion, thereby calculating a total integral of the belt response portion, such that the belt surface displacement position is calculated such that a ratio between a threshold integral of the vertical displacement probability density function from zero to the belt surface displacement position and the total integral of the belt response portion equals the predetermined threshold ratio.

12. The method for measuring product thickness of claim 11, further comprising:
   calculating the product upper surface displacement position, as a maximum likelihood response of the vertical displacement probability density function in a product piece response portion of the vertical displacement probability density function, above a null response portion.

13. The method for measuring product thickness of claim 12, further comprising:
   finding the maximum likelihood response using an optimization method of gradient ascent.

* * * * *